US009968223B2

(12) United States Patent
Behar et al.

(10) Patent No.: US 9,968,223 B2
(45) Date of Patent: May 15, 2018

(54) BLENDING APPLIANCE WITH PADDLE BLADE

(71) Applicant: Sunbeam Products, Inc., Boca Raton, FL (US)

(72) Inventors: Moises Behar, Boca Raton, FL (US); Joseph C. Spencer, Jr., Purvis, MS (US)

(73) Assignee: Sunbeam Products, Inc., Boca Raton, FL (US)

(*) Notice: Subject to any disclaimer, the term of this patent is extended or adjusted under 35 U.S.C. 154(b) by 114 days.

(21) Appl. No.: 15/180,933

(22) Filed: Jun. 13, 2016

(65) Prior Publication Data

US 2016/0360927 A1   Dec. 15, 2016

Related U.S. Application Data

(60) Provisional application No. 62/174,757, filed on Jun. 12, 2015.

(51) Int. Cl.
*B01F 7/00* (2006.01)
*A47J 43/08* (2006.01)
(Continued)

(52) U.S. Cl.
CPC ......... *A47J 43/085* (2013.01); *A47J 31/4403* (2013.01); *A47J 43/046* (2013.01);
(Continued)

(58) Field of Classification Search
CPC .... A47J 43/085; A47J 43/046; A47J 43/0722; A47J 31/4403; B01F 7/00275; B01F 7/00691; B01F 13/1044
(Continued)

(56) References Cited

U.S. PATENT DOCUMENTS

| 64,824 A | 3/1867 | Yingling et al. |
| 270,015 A | 1/1883 | Carter |

(Continued)

FOREIGN PATENT DOCUMENTS

| CN | 104013316 | 9/2014 |
| DE | 10244715 | 4/2004 |

(Continued)

OTHER PUBLICATIONS

Prism Pharma Machinery Manufacturers & Exporters of Pharmaceutical Machinery, Agitator—Stirrer, http://www.prismpharmamachinery.com/, 2013, Gujarat 382445, India.

(Continued)

*Primary Examiner* — Mark Halpern
(74) *Attorney, Agent, or Firm* — Seth M. Blum

(57) ABSTRACT

A blending appliance is provided including a motorized base, a blending container, and a blade assembly fitted into an opening of the blending container and rotatably coupled to the motorized base when the blending container is mounted on the motorized base. The blade assembly includes a lower blade element disposed on a spindle performing blending operations on ingredients at a lower end of the blending container; and an upper working element disposed on a shaft spaced apart from the lower blade element, and including an upper working portion and a lower working portion spaced apart from the upper working portion. The upper working portion acting to reduce cavitation in the lower blades element during the blending process.

20 Claims, 5 Drawing Sheets

(51) Int. Cl.
  *A47J 43/046* (2006.01)
  *A47J 43/07* (2006.01)
  *A47J 31/44* (2006.01)
  *B01F 13/10* (2006.01)

(52) U.S. Cl.
  CPC ....... *A47J 43/0722* (2013.01); *B01F 7/00275* (2013.01); *B01F 7/00691* (2013.01); *B01F 13/1044* (2013.01)

(58) Field of Classification Search
  USPC ........................................................ 366/205
  See application file for complete search history.

(56) References Cited

U.S. PATENT DOCUMENTS

| | | | |
|---|---|---|---|
| 1,148,032 A | 7/1915 | McLoy | |
| 2,208,955 A | 7/1940 | Wolff | |
| 2,243,443 A | 5/1941 | Sette | |
| 2,284,155 A | 5/1942 | Landgraf | |
| 2,384,952 A | 9/1945 | Miller | |
| 2,515,713 A | 7/1950 | Johnson et al. | |
| 2,525,421 A | 10/1950 | Misic | |
| 2,576,802 A | 11/1951 | Morris | |
| 2,595,985 A | 5/1952 | Schwaneke | |
| 2,637,537 A | 5/1953 | Ernst | |
| 2,688,992 A | 9/1954 | Russo | |
| 2,757,909 A | 8/1956 | Wayne | |
| 2,772,079 A | 11/1956 | Ernst | |
| 2,918,264 A | 12/1959 | Ackles | |
| 3,050,288 A | 8/1962 | Kolochynski | |
| 3,892,388 A | 7/1975 | Wass et al. | |
| 4,032,117 A | 6/1977 | Burgess | |
| 4,087,053 A | 5/1978 | Voglesonger | |
| 4,380,399 A | 4/1983 | Godat et al. | |
| 4,885,917 A * | 12/1989 | Spector | A23G 9/045 366/205 |
| 4,891,966 A | 1/1990 | Kramer | |
| RE34,386 E | 9/1993 | Davidson et al. | |
| 5,246,289 A | 9/1993 | Middleton et al. | |
| D366,596 S | 1/1996 | Hewin | |
| 5,647,665 A | 7/1997 | Schuler | |
| 5,720,552 A | 2/1998 | Schindlegger | |
| D391,806 S | 3/1998 | Khubani | |
| 5,800,852 A | 9/1998 | Levinson | |
| 5,823,672 A | 10/1998 | Barker | |
| 6,012,473 A | 1/2000 | Koyama | |
| 6,419,385 B1 | 7/2002 | Walls | |
| 6,488,403 B2 | 12/2002 | Lawson | |
| 6,609,821 B2 * | 8/2003 | Wulf | A47J 43/042 318/256 |
| 6,834,818 B2 | 12/2004 | Lee | |
| D551,020 S | 9/2007 | Kozlowski et al. | |
| 7,281,842 B2 | 10/2007 | Dickson, Jr. | |
| 7,347,615 B2 | 3/2008 | van der Plas | |
| 7,350,963 B2 | 4/2008 | Williams et al. | |
| 7,530,510 B2 | 5/2009 | Newman et al. | |
| 7,641,380 B2 | 1/2010 | Behar et al. | |
| 7,674,034 B2 | 3/2010 | Kozlowski et al. | |
| 7,740,401 B2 | 6/2010 | Kozlowski et al. | |
| D624,359 S | 9/2010 | Schleinzer | |
| 8,251,573 B2 | 8/2012 | Chou | |
| 8,414,180 B1 | 4/2013 | Mattingly et al. | |
| D684,817 S | 6/2013 | Leavitt | |
| D700,013 S | 2/2014 | Chu | |
| D702,085 S | 4/2014 | Audette | |
| 8,721,164 B2 | 5/2014 | Audette | |
| D706,581 S | 6/2014 | Pendleton et al. | |
| D709,324 S | 7/2014 | Guo et al. | |
| D709,325 S | 7/2014 | Guo et al. | |
| D729,573 S | 5/2015 | Moon et al. | |
| 9,108,170 B2 | 8/2015 | Wang et al. | |
| 9,283,528 B2 | 3/2016 | Thai | |
| 2005/0254341 A1 | 11/2005 | Gerling et al. | |
| 2006/0198241 A1 | 9/2006 | Krishnachaitanya et al. | |
| 2008/0253224 A1 | 10/2008 | Kozlowski et al. | |
| 2013/0032038 A1 | 2/2013 | Lee et al. | |
| 2015/0305563 A1 | 10/2015 | Isenberg et al. | |
| 2016/0037970 A1 | 2/2016 | Golino et al. | |

FOREIGN PATENT DOCUMENTS

| | | |
|---|---|---|
| DE | 202010008152 | 2/2011 |
| EP | 0795290 | 9/1997 |
| EP | 1585417 | 10/2005 |
| EP | 1982624 | 10/2008 |
| FR | 2492246 | 8/1983 |
| GB | 411763 | 6/1934 |
| GB | 2508883 | 6/2014 |
| GB | 2522899 | 8/2015 |
| MX | 9601997 | 11/1997 |
| MX | 01000397 | 8/2002 |
| MX | 00000104 | 10/2002 |
| MX | PA03004312 | 7/2004 |
| MX | 2007016323 | 6/2009 |
| MX | 2009005805 | 6/2009 |
| MX | 2010004001 | 10/2010 |
| MX | 20100010796 | 11/2010 |
| MX | 2010012900 | 12/2010 |
| MX | 2010012901 | 12/2010 |
| MX | 2010013408 | 12/2010 |
| MX | 2010013472 | 12/2010 |
| MX | 2012004445 | 6/2012 |
| MX | 2012010141 | 11/2012 |
| MX | 2012012799 | 1/2013 |
| MX | 2012010606 | 2/2013 |
| MX | 2012003757 | 5/2013 |
| MX | 2013009899 | 11/2013 |
| MX | 2013012889 | 2/2014 |
| MX | 2013009620 | 5/2014 |
| MX | 2014005518 | 6/2014 |
| MX | 2014011795 | 1/2015 |
| MX | 2014015770 | 8/2015 |
| MX | 2015005704 | 8/2015 |
| MX | 2015005110 | 9/2015 |
| NO | 9615706 | 5/1996 |

OTHER PUBLICATIONS

Tribomb, Ninja Kitchen System 1200 Blender, http://www.tribomb.com/review.php?ID=66#.VyeCsvkrJFE, Retrieved May 2, 2016.

* cited by examiner

BLENDING APPLIANCE WITH PADDLE BLADE

CROSS-REFERENCE TO RELATED APPLICATION

The present application claims benefit of U.S. Provisional Patent Application No. 62/174,757 filed Jun. 12, 2015, entitled Paddle Style Blender Blade, the contents of which are incorporated in its entirety.

FIELD OF THE INVENTION

The invention relates to food preparation devices. More particularly, the invention relates to a blending or food processing appliance with an improved agitator configuration having both conventional blending blades and a blending implement to resist cavitation in the upper areas of the blending container.

BACKGROUND OF THE INVENTION

Blending appliances used to blend beverages from solid and liquid ingredients are known. These blending appliances typically use blades disposed in proximity to the bottom of the blending jar and formed from blade sets that perform different functions. Known problems include cavitation and solidification of blending ingredients in areas of the blending jar remote from the blade configuration at the bottom of the blending jar.

SUMMARY OF THE INVENTION

There is provided a blending appliance including a motorized base, a blending container, and a blade assembly fitted into an opening of the blending container and rotatably coupled to the motorized base when the blending container is mounted on the motorized base. The blade assembly is configured to allow for traditional blending functions while substantially eliminating the cavitation of the blade assembly during operations. In as much, the blade assembly includes upper working elements and lower blade elements positioned on a central shaft.

The lower blade elements are positioned proximal to the first end of the central shaft and can include a plurality of blade forms. In an embodiment, a top form, a middle blade form, and a bottom blade form are provided. The top and bottom blade forms can be similar to a conventional blender blade design (one or more generally U-shaped blades).

The middle blade form can be an altered food processing blade design suited for use in a small throat jar. Wherein a typical food processor blade arrangement may include one or more generally flat blades extending radially outward from a central point of rotation. The middle blade form can be an S-shaped food processing blade bent at opposing ends to a generally U-shaped configuration.

The upper working elements is positioned adjacent to a second end of the central shaft, and can include top and lower working members. The top working member can include first and second wing portions extending in opposite directions, where the top wing portion can be extended at an upward angel and the lower wing portion can be extended and a downward angle. Additionally, the first and second wing portions can be twisted with respect to a horizontal axis.

The lower working member can include first and second wing portions extending radially, in opposite directions. The first and second wing portion can extend radially outward in a substantially horizontal direction. Additionally, the first and second wing portions can be twisted with respect to a horizontal axis. The positioning of the upper and lower working members act to substantially prevent a cavitation of the blade assembly during the blending process.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 4 is a front view of the improved blade assembly of FIG. 2; and

DETAILED DESCRIPTION OF THE INVENTION

Figure 1:
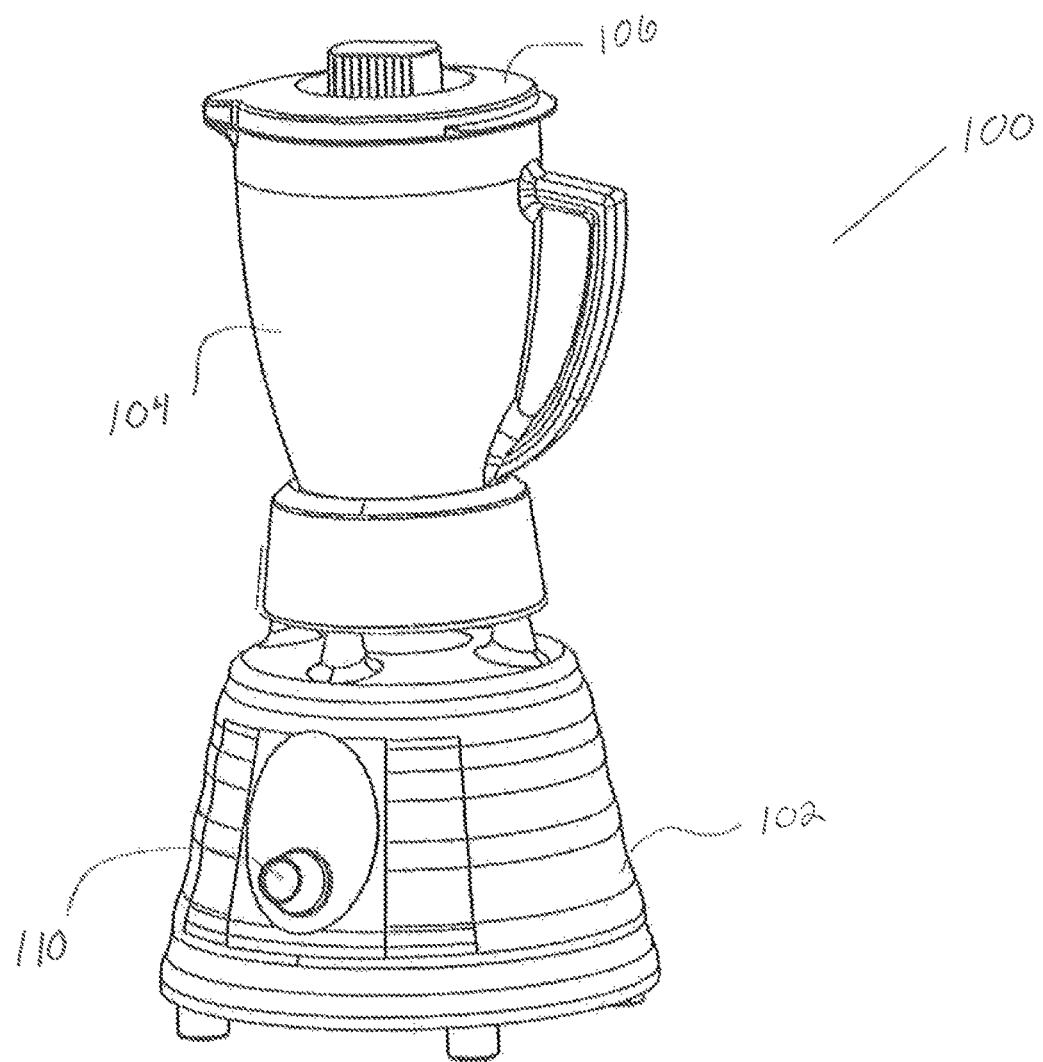
FIG. 1 is a perspective view of a blending appliance with a blending jar with an improved blade assembly.

While the present invention may be susceptible to embodiment in different forms, there are shown in the drawings, and herein will be described in detail, embodiments with the understanding that the present description is to be considered an exemplification of the principles of the invention and is not intended to limit the invention to that as illustrated and described herein. Instead, it is envisioned that those skilled in the art may devise various modifications and equivalents without departing from the spirit and scope of the appended claims.

Figure 2:
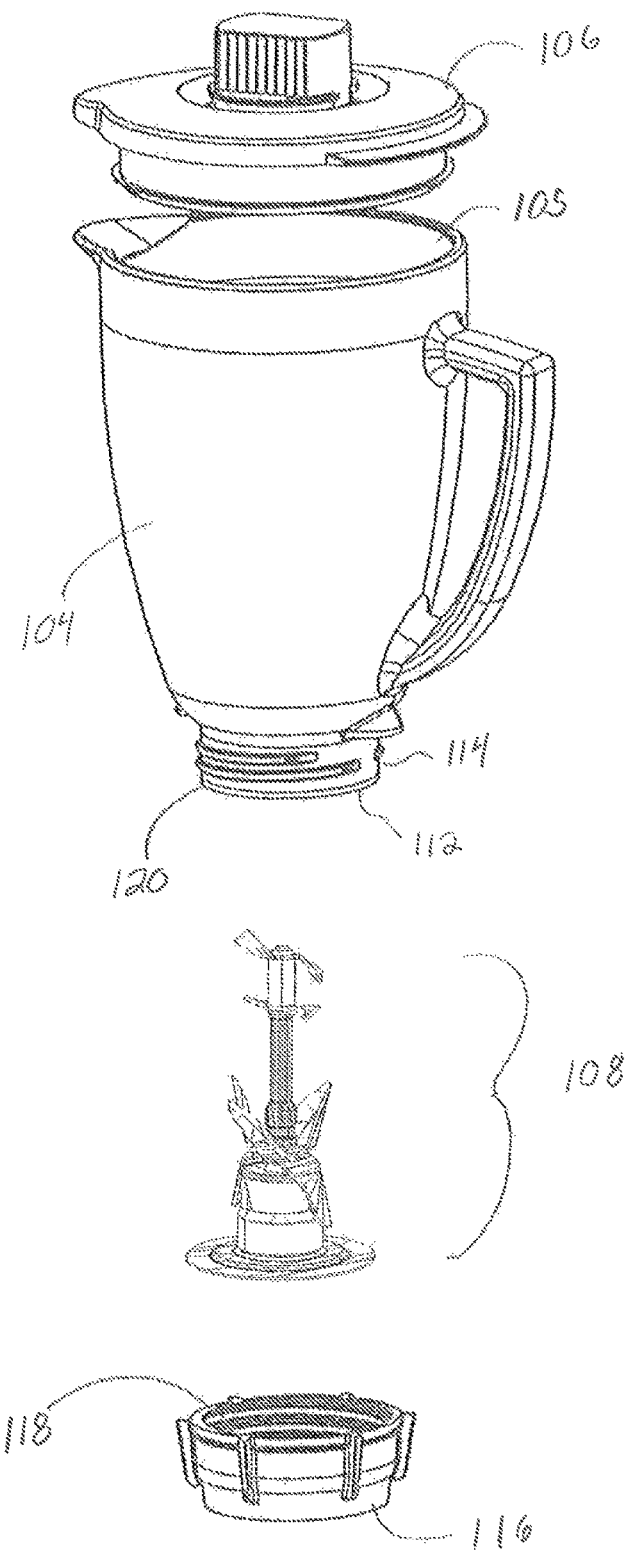
FIG. 2 is a partially exploded perspective view of the blending jar with the improved blade assembly of FIG. 1.

Referring now to FIGS. 1 and 2 of the drawings, in an embodiment there is illustrated a blending or food processing appliance 100. The blending appliance 100 includes a motorized base 102 and a blending jar 104. In use, the blending jar 104 fits into a recess (not shown) formed in the base 102. The blending jar 104 includes a removable lid 106 that fits into an open top 105 of the blending jar 104. The base 102 includes an electrical motor (not shown) for providing rotary power to a blade assembly 108 disposed within the blending jar 104. Electronic controls 110 in the base 102 control electrical power to the electrical motor (not shown) which in an embodiment may include one or more switches for controlling the electrical motor (not shown) at various speeds including "off", "low", "medium" and "high". In an alternate embodiment, the electronic controls may include a microprocessor (not shown) with memory storing pre-programmed routines for controlling the electrical motor (not shown).

The blade assembly 108 is inserted into an opening 112 on the bottom end 114 of the blending jar 104 and secured therein with an agitator nut 116. The agitator nut 116 includes internal threads 118 that engage complementary threads 120 around the bottom end 114 of the blending jar 104.

Figure 3:
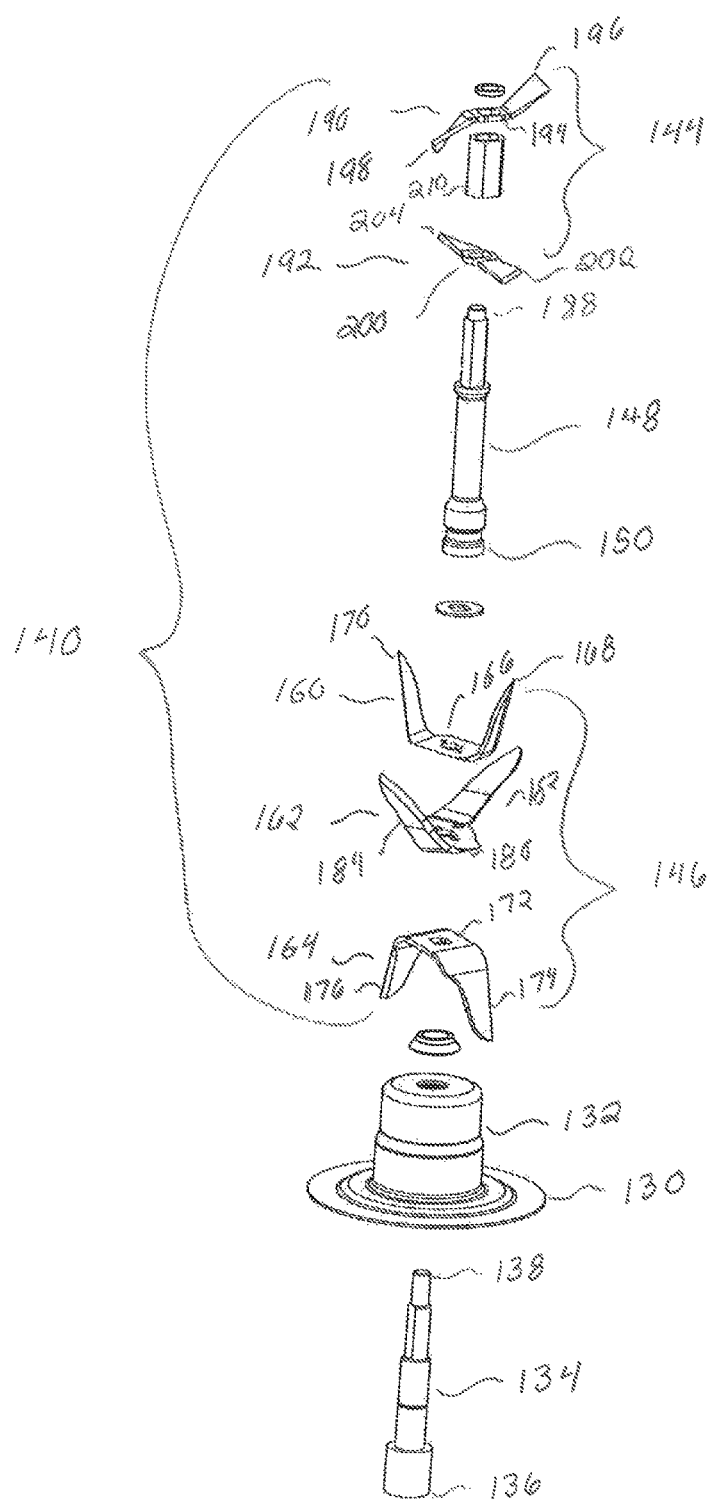
FIG. 3 is an exploded perspective view of the improved blade assembly of FIG. 2.
Figure 41:
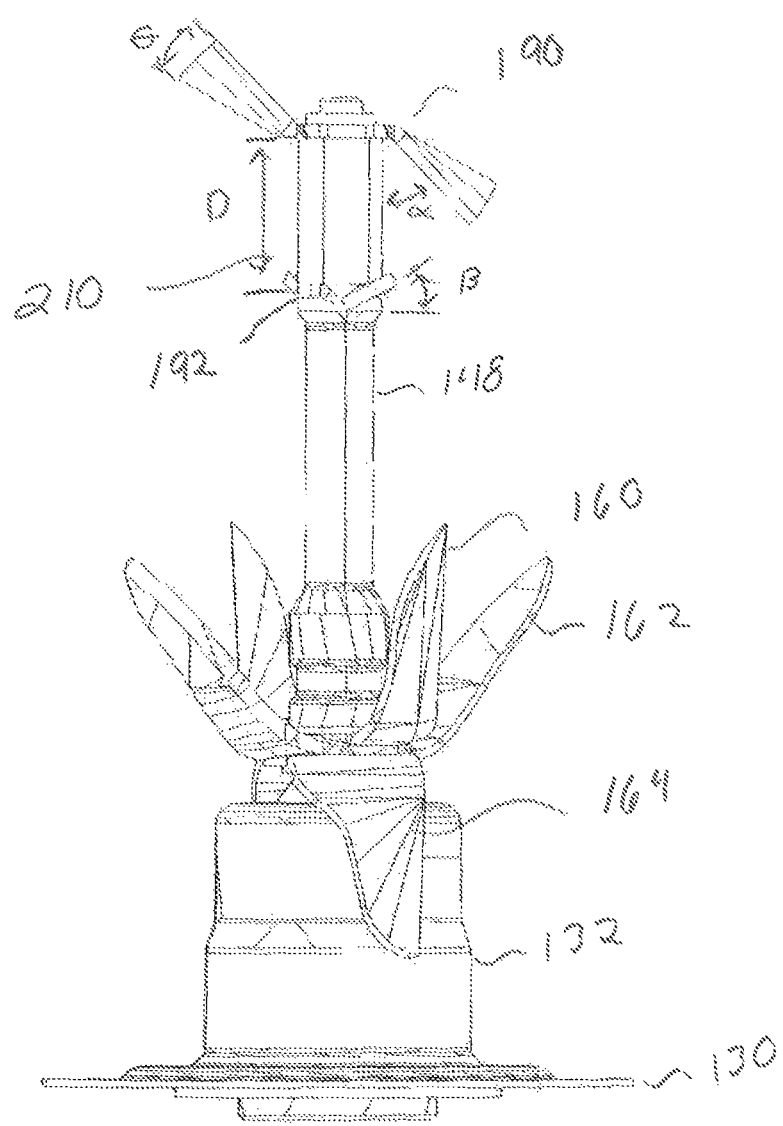
Figure 5:
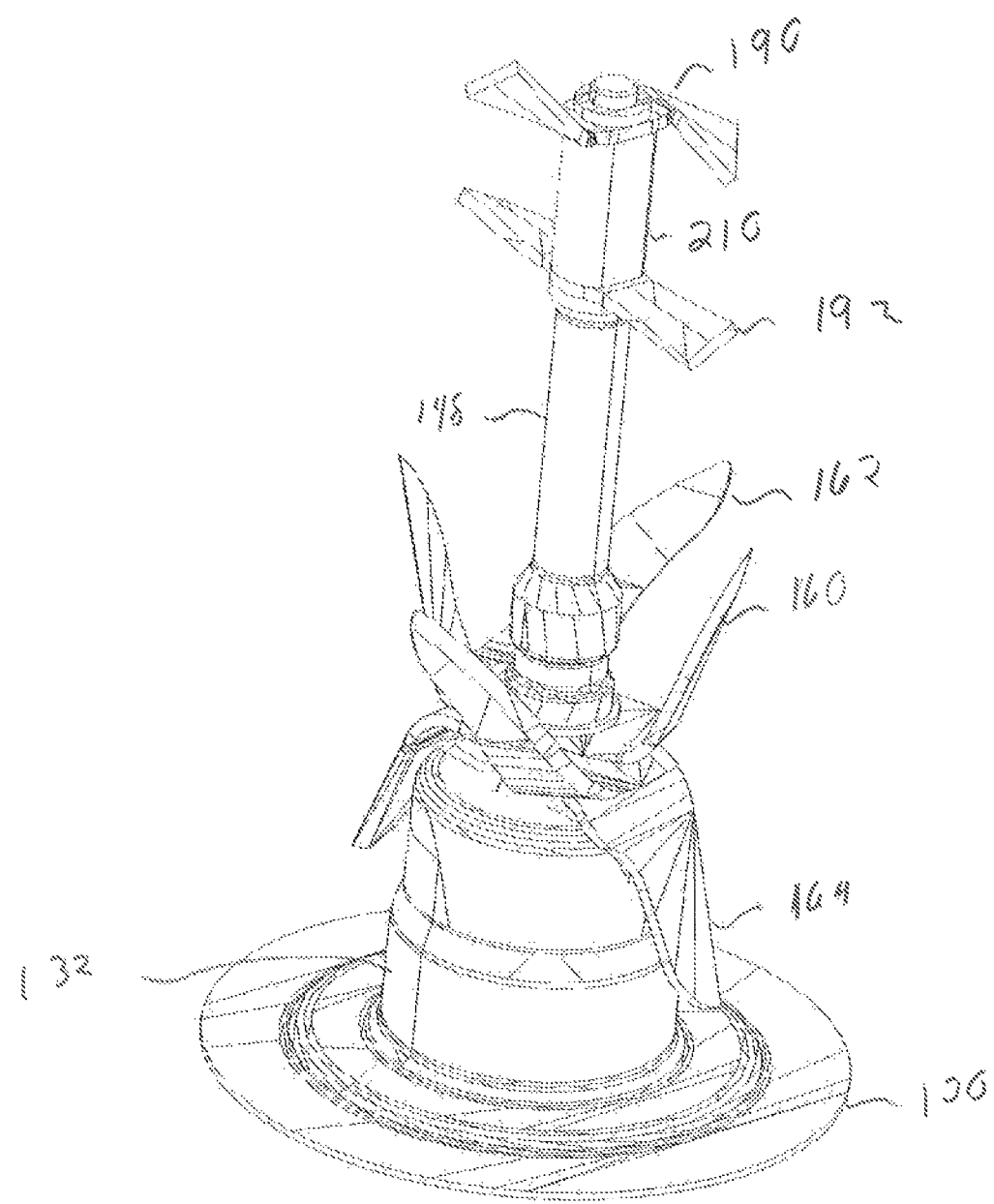
FIG. 5 is a top isometric view of the improved blade assembly of FIG. 2.

Referring now to FIGS. 3-5, the blade assembly 108 comprises a base 130 having a generally circular shape with an extended central hollow post 132. A collared rotational shaft 134 is mounted to and driven by the blender/food processor motor (not shown) at a first end 136. Rotational shaft 134 passes through the hollow post 132 and is removably affixed to a blade stack 140 at a second end 138. A circular sealing gasket can be provided about the outer periphery 142 of base 130 for sealing the blender/food processor jar 104 against the base 130 during operation.

The blade stack 140 of the blade assembly 108 is configured to allow for traditional blending functions while substantially eliminating the cavitation of the blade assembly 108 during operations. The blade stack 140 can include upper working elements 144 and lower blade elements 146 positioned on a central shaft 148, where a first end 150 of the central shaft 148 is connected to the second end 138 of the rotational shaft 134.

The lower blade elements 146 are positioned proximal to the first end 150 of the central shaft 148 and can include a top or first blade form 160, a middle or second blade form 162, and a third or bottom blade form 164. The blade forms 160, 162, 164 may be made of any durable material such as metal, steel, carbon, composites, or any combinations of such material which can be sharpened and withstand the high stresses and heats generated in this environment.

The top blade form 160 and bottom blade form 164 are preferably similar to a conventional blender blade design (one or more generally U-shaped blades). In particular, the top blade form 160 includes a central, substantially flat base 166 that extends radially with respect to the longitudinal rotational axis of the blade assembly 108. A first wing portion 168 extends at a first angle upward from the base 166 and a second wing portion 170 extends at a second angle upward from an opposing end of the base 166. While it is preferred that first and second wing portion's respective angles are not equal so as to provide enhanced blending and processing, it should be noted that such angles may be identical.

As with the top blade form 160, bottom blade form 164 includes a central, substantially flat base 172 extending radially with respect to the longitudinal rotational axis of the blade assembly 108. First 174 and second 176 curved blades are preferably formed integrally with the base 172, and extend downward and outward from opposing ends of the base 172. The curved shape of the blades 172 and 176 enhances blending and processing, and permits the edges of the blades 174 and 176 to extend to adjacent the blade assembly base 108. In this manner, blended and processed items are dislodged and forced upward from the bottom of the jar 104.

The middle blade form 162 can an altered food processing blade design suited for use in a small throat jar 104. Wherein a typical food processor blade arrangement may include one or more generally flat blades extending radially outward from a central point of rotation, the middle blade form 162, in accordance with a preferred embodiment, is an S-shaped blade bent at opposing ends to a generally U-shaped configuration. The middle blade form 162 cooperates with the top and bottom blade forms 160 and 164 to enhance the circulation of blended or processed items while avoiding interference with the performance of the other blades.

Middle blade form 162 has a central, substantially flat base 180 extending radially from the longitudinal axis of rotation of the blade assembly 109. The central bases 166, 172, and 180 of each of the top, middle and bottom blade forms 160, 162, and 164 are circumferentially offset from each other by a predefined angle as will be discussed in greater detail below. A first wing portion 182 of the middle blade form 162 extends upward and curves circumferentially away from the middle blade form's central base 180. Similarly, from an opposing end of the central base 180, a second wing portion 184 extends upward and curves circumferentially away from the central base 180. The resultant compound curve of the first and second wing portions 182 and 184 of the middle blade form 162 allow for a longer blade length for improved food processing capabilities.

The longer blade lengths allowed by the compound curve shape of the middle blade form 162 provides a continuous-radius edge along the entirety of each of the wing portions 182 and 184 so as to improve food processing performance of the blade assembly 108 similar to that of the typical flat blades found in food processors. A knife-sharpened edge additionally enhances the middle blade form's performance. Still further, the gull wing shape of the middle blade form 162 allows for its use in a small throat blender/processor jar 104 without negatively effecting the circulation of the blended/processed items during its operation. In part, the gull wing shape of the middle blade form 162 achieves this balance of improved performance and reduced circulatory impact by remaining an optimal distance from an inner throat wall of the blender/processor jar 104. The gull-wing shape allows for a balancing of being far enough away from the inner throat wall so as not to merely force items down into the bottom blade form 164 and thus liquefy them, while not placing the blade tips so far from the inner throat wall as to fail to pull the processed items into the blade stack 140 for processing.

In an embodiment, the wing portions 182 and 184 of the middle blade form 162 make generally about a 75° angle with the horizontal plane (i.e., generally about a 105° vertical angle between the wing portions 182 and 184 and the central base 180 of the middle blade form 162). Further, the point of intersection of the wing portions 182 and 184 and the central base 180 of the middle blade form 162, the bend line, makes an angle generally about 34.5° with the center line of the S-shaped middle blade form's central base 180. These angles can provide for improved interaction between the middle blade form 162, the inner jar wall, and the processed items (not shown).

With regard to the interaction of the top, bottom and middle blade forms 160, 162, and 164, in an embodiment, the blade tips of the blending blades, the top and bottom blade forms 160 and 164, are offset by an angle between 25° and 30° and the angle formed between the tips of the middle and bottom blade forms 162 and 164 is generally between 70° and 80°. It is these angles of rotation and the various angles of lift on the individual wing portions of the various blade forms that directly drive the performance of the blade assembly 108 by reducing interference by one blade form with another while enhancing the ability to circulate the blended/processed items and reducing the wear-and-tear on the assembly's bearings and the blender/processor motor (not shown).

The upper working elements 144 are positioned adjacent to a second end 188 of the central shaft 148, spaced a distance L from the lower blade elements. The distance L can be between 1.5 and 2.5 inches in length.

The upper working element 144 can include a first, top, working member 190, and a second, lower, working member 192. The top and lower working members 190 and 192 may be made of any durable material such as metal, steel, carbon, composites, or any combinations of such material which can be sharpened and withstand the high stresses and heats generated in this environment.

The top working member 190 can include a central, substantially flat base 194 that extends radially with respect to the longitudinal rotational axis of the blade assembly 108. First and second wing portions 196 and 198 extend in opposite directions from the base 194. The first wing portion 196 can be extended at an upward angel from the flat base 194, and the second wing form can be extended and a downward angle from the flat base 194, opposite the first wing form 196. The angle of extension of the first and second wing portions 196 and 198 can be between about 20°-40° with respect to the horizontal, where in one embodiment the angle of extension can be between 34°-38°.

Alternatively, the first and second portions 196 and 198, can both extend at upward angles, downward angles, or horizontally from the base 194.

Additionally, the first and second wing portions 196 and 198 can be twisted with respect to a horizontal axis of the flat bass 194. In an exemplary embodiment, the first and second wing portions 196 and 198 can each be twisted in a clock wise direction, where each of the first end second wing portions can be twisted between 30°-60° at their ends. Alternatively, the first and second wing portions 196 and 198 can each be twisted in a counter-clock wise direction or is opposite directions. It is noted that the provided angle is only exemplary in nature, and other angles are contemplated.

The lower working member 192 can include a central, substantially flat base 200 that extends radially with respect to the longitudinal rotational axis of the blade assembly 108. First and second wing portions 202 and 204 extend radially, in opposite directions from the base 194. The first and second wing portions 202 and 204 can extend radially outward in a substantially horizontal direction. Alternatively, the first and second portions 202 and 204, can both extend at upward angles, downward angles, or opposing upward and downward angled from the base 200.

Additionally, the first and second wing portions 202 and 204 can be twisted with respect to a horizontal axis of the flat base 200. In an exemplary embodiment, the first and second wing portions 202 and 204 can each be twisted in a clock wise direction, where each of the first end second wing portions can be twisted between 20°-35° at their ends. Alternatively, the first and second wing portions 202 and 204 can each be twisted in a counter-clock wise direction or is opposite directions. It is noted that the provided angle is only exemplary in nature, and other angle are contemplated.

It should be understood that the number of working member disclosed as part of the upper working element 144 is only exemplary in nature, and it is contemplated that any number of working members can be utilized.

A spacer 210 can be position on the central shaft 148, interposed between the upper and lower working member 190 and 192. The spacer 210 separates the upper and lower working member 190 and 192 a distance "D." The distance "D" can be between 0.25 and 0.75 inches in length.

In use, the blade assembly 109, in accordance with the preferred embodiment, is mounted within a blender/food processor appliance base 102 having a motor suited for driving the blade assembly 108. The blender jar 104 is mounted over the blade assembly 108 and within the appliance base 102. The sealing gasket is located between the blade assembly base 120 and the bottom 114 of the jar 104 serves to make the combined structure water tight.

Upon the introduction of items into the jar 104 to be blended/processed, a user may initiate the operation of the appliance. The top blade form 160 serves to effectively crush ice. The middle blade form 162 with its long continuous radius edge blade operates to process solid food stuffs including heavier items such as nuts, vegetables, and meats. Finally, the bottom blade form 164 operates to assist in the mixing of larger particulate matter and liquids by enhancing circulation of the items being blended/processed and to liquefy soft food items, such as tomatoes. Additionally, the upper and lower working members 190 and 192 of the upper working element 144 act to substantially prevent a cavitation of the blade assembly 108 during the blending process.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A blending appliance, comprising:
a motorized base;
a blending container; and
an blade assembly fitted into an opening of the blending container and rotatably coupled to the motorized base when the blending container is mounted on the motorized base, the blade assembly including:
a central shaft having a lower end and a free upper end;
a lower blade element disposed proximal to the lower end of the central shaft for performing blending operations on ingredients at a lower end of the blending container; and
an upper working element disposed proximal to the free upper end of the central shaft, spaced apart from the lower blade element, and including;
an upper working portion having a first and second wing portions extending radially outward from the central shaft in opposite directions, wherein the first and second wing portions are at an acute angle from a longitudinal axis of the central shaft; and
a lower working port spaced apart a distance below the upper working portion, and having a first and second wing portions extending radially outwardly from the central shaft in opposite directions.

2. The blending appliance as set forth in claim 1, wherein the lower blade element includes a top blade form including opposing wing portions angled upward.

3. The blending appliance as set forth in claim 1, wherein the lower blade element includes a bottom blade form including opposing wing portions angled downward.

4. The blending appliance as set forth in claim 3, wherein the lower blade element includes a mid-blade form including opposing wing portions angled upward.

5. The blending appliance as set forth in claim 1, wherein the first wing portion of the upper working portion is angled upward with respect to the central shaft and the second winged portion of the upper working portion is angled downward with respect to the central shaft.

6. The blending appliance as set forth in claim 5, wherein the first and second wing portions of the upper working portion are twisted.

7. The blending appliance as set forth in claim 1, wherein each of the first and second wing portions of the lower working portion are twisted.

8. The blending appliance as set forth in claim 1, wherein the first and second wing portions of the upper working portion are positioned at an angle between 20°-40° with respect to a horizontal plane perpendicular to the longitudinal axis of the central shaft.

9. The blending appliance as set forth in claim 1, wherein the first wing portion of the upper working portion is positioned at an upward angle between 20°-40° with respect to a horizontal plane perpendicular to the longitudinal axis of the central shaft, and the second wing portion of the upper working portion is positioned at a downward angle between 20°-40° with respect to the horizontal plane perpendicular to the longitudinal axis of the central shaft.

10. A blender blade assembly, comprising:
a central shaft having a lower end and a free upper end;
a lower blade element disposed proximal to the lower end of the central shaft for performing blending operations on ingredients at a lower end of the blending container; and
an upper working element disposed on the free upper end of the central shaft spaced apart from the lower blade element including:
an upper working portion having a first and second wing portions extending radially outward from the central shaft in opposite directions, wherein the first and second wing portions are at an acute angle from a longitudinal axis of the central shaft; and
a lower working portion spaced apart a distance below the upper working portion, and having a first and second wing portions extending radially outwardly from the central shaft in opposite directions.

11. The blender blade assembly as set forth in claim 10, wherein the lower blade element includes a top blade form including opposing wing portions angled upward.

12. The blender blade assembly as set forth in claim 11, wherein the lower blade element includes a bottom blade form including opposing wing portions angled downward.

13. The blender blade assembly as set forth in claim 12, wherein the lower blade element includes a mid-blade form including opposing wing portions angled upward.

14. The blade assembly for use with a blender appliance of claim 12, wherein the first wing portion of the upper working portion is angled upward and the second winged portion of the upper working portion is angled downward.

15. The blender blade assembly of claim 10, wherein the first wing portion of the upper working portion is angled upward with respect to the central shaft and the second winged portion of the upper working portion is angled downward with respect to the central shaft.

16. The blender blade assembly as set forth in claim 15, wherein the first and second wing portions of the upper working portion are twisted.

17. The blender blade assembly as set forth in claim 10, wherein each of the first and second wing portions of the lower working portion are twisted.

18. The blender blade assembly as set forth in claim 10, wherein the first and second wing portions of the upper working portion are positioned at an angle between 20°-40° with respect to a horizontal plane perpendicular to the longitudinal axis of the central shaft.

19. The blender blade assembly as set forth in claim 10, wherein the first wing portion of the upper working portion is positioned at an upward angle between 20°-40° with respect to a horizontal plane perpendicular to the longitudinal axis of the central shaft, and the second wing portion of the upper working portion is positioned at a downward angle between 20°-40° with respect to the horizontal plane perpendicular to the longitudinal axis of the central shaft.

20. A blade assembly for use with a blending appliance, comprising:
a central shaft having a lower end and a free upper end;
a lower blade element disposed proximal to the lower end of the central shaft for performing blending operations on ingredients at a lower end of the blending container; and
an upper working element positioned proximal to the free upper end of the central shaft, spaced apart from the lower blade element, and including:
an upper working portion having a first and second wing portions extending radially outward from the central shaft in opposite directions, wherein the first and second wing portions of the upper working portion are positioned at an angle between 20°-40° with respect to a horizontal plane perpendicular to the longitudinal axis of the central shaft; and
a lower working portion spaced apart a distance below the upper working portion, and having a first and second wing portions extending radially outwardly from the central shaft in opposite directions, wherein the first and second wing portions of the lower working portion are twisted between 20°-35° with respect to the horizontal plant.

* * * * *